United States Patent Office 2,720,497
Patented Oct. 11, 1955

2,720,497

CONDENSATION PRODUCTS FROM ALKENE OXIDES WITH POLYCYCLIC ALCOHOLS AND HYDROXYLATED POLYCYCLIC ALDEHYDES

John C. Hillyer, Bartlesville, Okla., assignor to Phillips Petroleum Company, a corporation of Delaware No Drawing. Application October 13, 1952,
Serial No. 314,576

8 Claims. (Cl. 260—30.4)

This invention relates to condensation products of alkene oxides with polycyclic alcohols and hydroxylated polycyclic aldehydes and hydrogenated and alkyl derivatives of each. In one of its aspects this invention relates to the condensation product of 2,3,4,5-bis($\Delta^2$-butenylene)tetrahydrofurfuryl alcohol and an alkene oxide. In another of its aspects this invention relates to new compositions useful as rubber plasticizers. In still another of its aspects this invention relates to novel rubber compositions.

Each of the objects of this invention will be obtained by at least one of the aspects thereof.

An object of this invention is to provide new compositions of matter comprising condensation products of alkene oxides with polycyclic alcohols and hydroxylated polycyclic aldehydes and hydrogenated and alkyl derivatives of each. Another object of this invention is to provide as a new composition a condensation product of 2,3,4,5-bis($\Delta^2$-butenylene)tetrahydrofurfuryl alcohol and an alkene oxide. Still another object of this invention is to provide a class of compositions useful as rubber plasticizers. A further object of this invention is to provide novel rubber compositions. Further and additional objects will be apparent to those skilled in the art upon reading of the accompanying disclosure.

According to my invention new and novel compositions are obtained by the condensation of polycyclic alcohols and hydroxylated polycyclic aldehydes and hydrogenated and alkyl derivatives of each with an alkene oxide. The starting products of this invention are prepared initially by condensing 2 mols of a conjugated diolefin with 1 mol of a furfural as described in the article by Hillyer and Nicewander, Ind. Eng. Chem. 40, 2216 (1948) and application Serial No. 81,413, filed March 14, 1949, now U. S. Patent 2,683,151 (1954). The aldehydic group of the resulting polycyclic aldehyde can then be reduced to the alcohol, preferably in the manner disclosed and claimed in the copending application of Hillyer, Serial No. 255,520, filed November 8, 1951, now U. S. Patent 2,687,419 (1954). The resulting alcohol by itself can be employed, or it and the polycyclic aldehyde can be hydroxylated as disclosed and claimed in the copending application of Hillyer, Serial No. 305,286, filed August 19, 1952. Broadly, the starting compounds of this invention can be represented by the following formula:

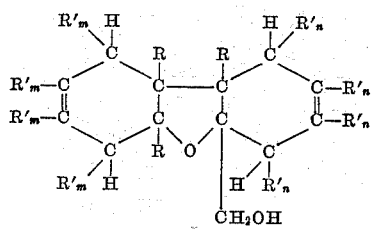

and hydroxylated derivatives of

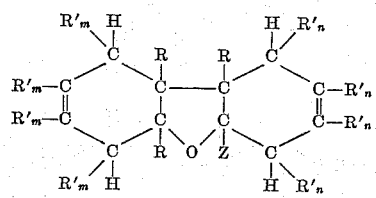

wherein Z is selected from the group consisting of —CH$_2$OH and —CHO; R is selected from the group consisting of hydrogen and methyl and at least one R is hydrogen; each R' is selected from the group consisting of hydrogen and an alkyl group having not more than 3 carbon atoms; the sum of the carbon atoms in the R'$_m$ groups is less than 4; the sum of the carbon atoms in the R'$_n$ groups is less than 4; and at least 2 of the R'$_m$ and at least 2 of the R'$_n$ groups are hydrogen.

The term "alkyl" as used herein means an organic radical having the general formula C$_n$H$_{2n+1}$.

The following are formulae of specific starting materials that can be condensed with alkene oxides according to this invention:

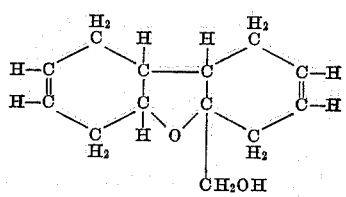

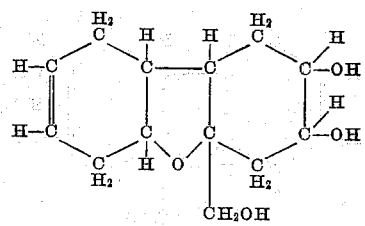

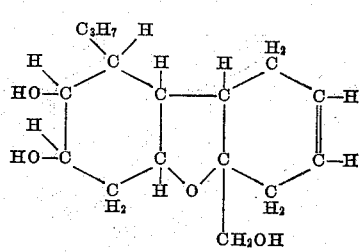

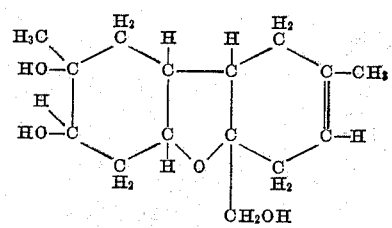

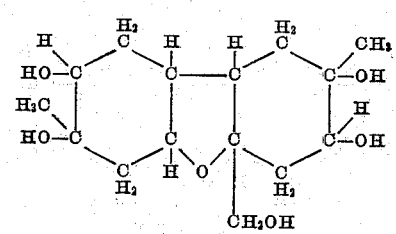

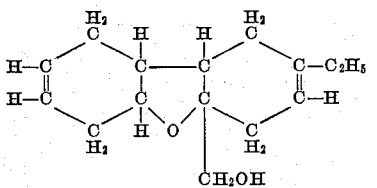

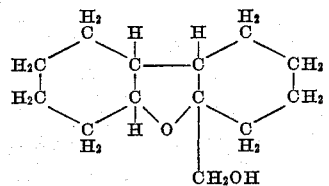

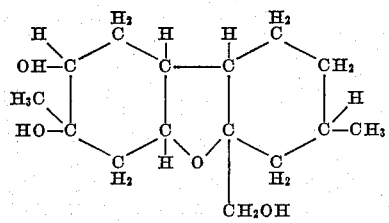

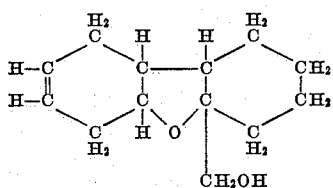

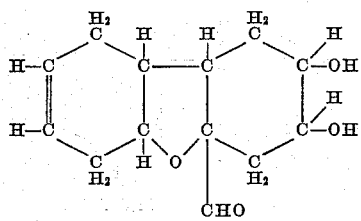

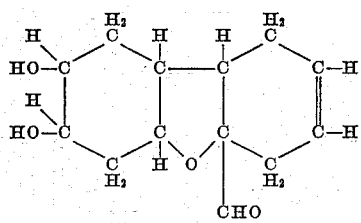

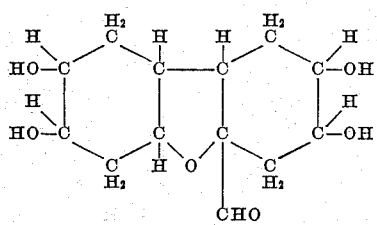

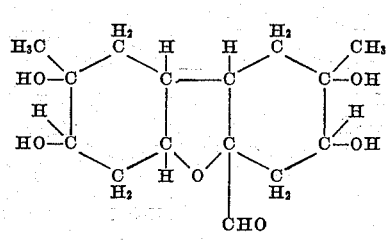

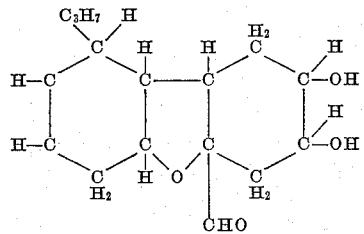

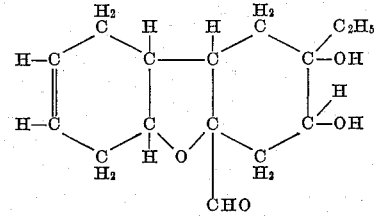

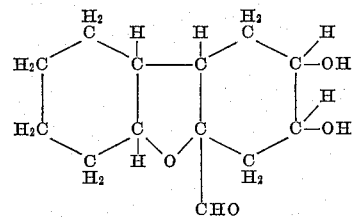

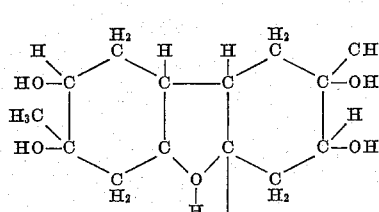

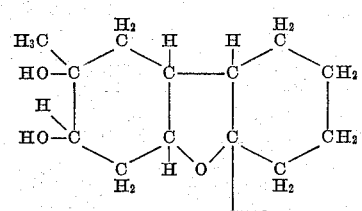

Those skilled in the art will recognize that the non-alkylated compounds illustrated are obtained initially by condensing furfural with butadiene, that the dimethylated compounds are obtainable initially from furfural and isoprene, and that monomethylated compounds are obtained initially from butadiene, isoprene, and furfural, the condensation product being reduced when the alcohol is desired, and the alcohol or aldehyde being hydroxylated, and hydrogenated if desired.

Alkene oxide condensation products prepared from polycyclic alcohols and hydroxylated polycyclic aldehydes according to this invention can be represented by the formulae

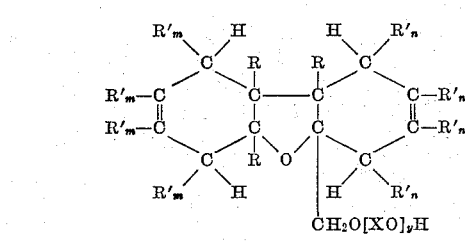

I

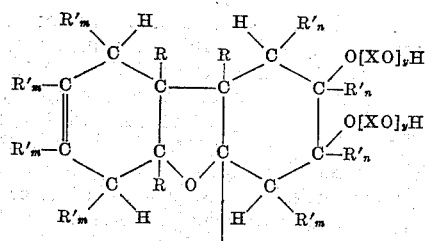

II

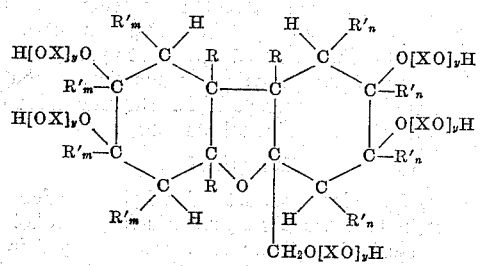

III

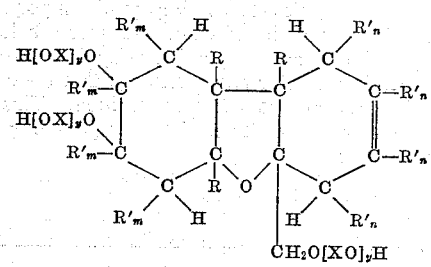

IV

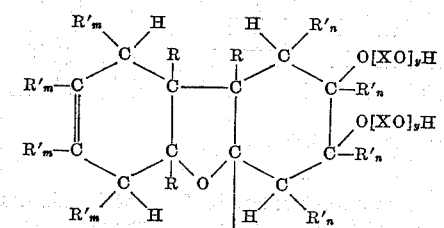

V

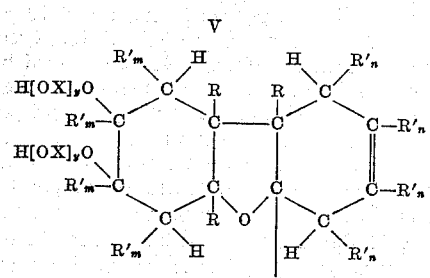

VI

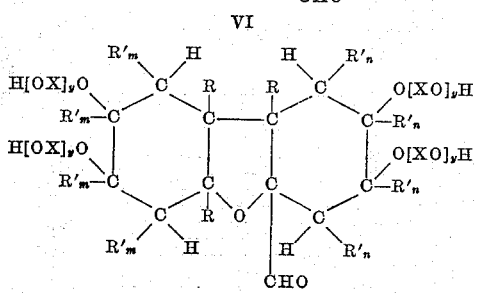

VII and the hydrogenated derivatives of compounds I, II, IV, V and VI wherein X is an alkylene radical containing from 2 to 5 carbon atoms, y is an integer from 1 to 16; each R is of the group consisting of hydrogen and methyl and at least one R is hydrogen; each R' is selected from the group consisting of hydrogen and an alkyl group having not more than 3 carbon atoms; the sum of the carbon atoms in the $R'_m$ groups is less than 4; the sum of the carbon atoms in the $R'_n$ groups is less than 4; and at least two of the $R'_m$ and at least two of the $R'_n$ groups are hydrogen.

It is obvious from the above formulae that when either or both of the double bonds of the starting material are hydroxylated, it is possible that condensation with an alkene oxide can take place on one or more of the hydroxy groups. In the case of the aldehyde hydroxylation of at least one of the double bonds is necessary. The remaining double bond can be hydrogenated. Specific examples of products are:

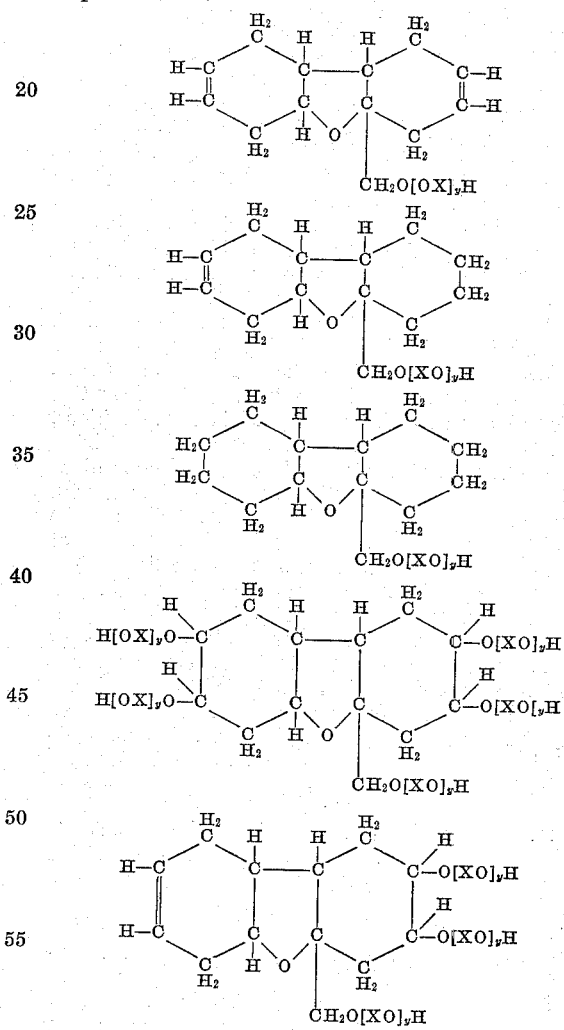

wherein X is an alkylene radical having from 2 to 5 carbon atoms and y is an integer from 1 to 16.

When preparing the condensation products of this invention the starting material, as hereinbefore described, is dissolved in a suitable solvent and contacted with an alkene oxide in the presence of an alkaline catalyst. The amount of alkene oxide employed can be sufficient so that from 1 to 16 mols of alkene oxide will condense with each OH group in the starting material. A suitable agitation means can be provided. The condensation is ordinarily effected at a temperature in the range between 150 and 300° F., preferably between 200 and 275° F. Sufficient pressure is maintained to keep the reaction mixture in substantially liquid phase. One convenient method of operation is to add the alkene oxide as a solution in a solvent, usually the same solvent that is employed for the starting material. On account of the exothermic nature of the reaction the rate of addition of the alkene oxide must be regulated in such a manner that the temperature can be maintained at the desired level. The rate of addition of the reactant is dependent upon such factors as the efficiency of the cooling means and rate of agitation. Subsequent to addition of the alkene oxide, the reaction mixture is maintained at the desired temperature for a period generally in the range between 30 minutes and 5 hours to allow sufficient time for the materials to react. In general all the alkene oxide will undergo reaction with the starting material.

Alkene oxides which are applicable are those containing from two to five carbon atoms per molecule, such as ethylene oxide, propene oxide, 1,2-epoxy-2-methylpropane (isobutylene oxide), 1,2-epoxybutane, 2,3-epoxybutane, 1,2-epoxy-2-methylbutane, 2,3-epoxypentane, and the like.

Solvents which are generally preferred are hydrocarbons, for example, paraffins and cycloparaffins, such as hexanes, heptanes, octanes, cyclohexane, methylcyclohexane, and the like. Aromatic hydrocarbons, such as benzene, toluene, and xylene can also be used.

Catalysts which are applicable are those which are known to promote alkene oxide-alcohol and alkene oxide-mercaptan condensation reactions. They include alkali metal alkoxides and aqueous and alcoholic solutions of alkali metal hyrdoxides. Alcohols which can be employed are those which are low boiling, such as methanol, ethanol, and the propanols. One of the catalysts frequently used is sodium hydroxide dissolved in methanol.

The products of this invention can be employed as plasticizers for resins and synthetic or natural rubber. Other potential uses of the products of this invention appear to be as an additive of insecticidal compositions, as a lubricating oil additive and as a wax modifier. When employed as rubber plasticizers the compositions of this invention can be used alone or as mixtures with each other or in conjunction with other plasticizers. The amount employed will vary depending upon the type of rubber stock being processed and the properties desired in the finished product. The amount employed will generally be in the range of from 5 to 25 weight per cent based on the rubber, and more preferably in the range of 10 to 20 weight per cent. Synthetic rubbers with which the novel compositions of this invention may be incorporated as plasticizers include 1,3-butadiene-styrene copolymer, polybutadiene, polyisoprene, butadiene-acrylonitrile copolymer, polychloroprene and the like.

Example I

A solution of 150 grams (0.729 mols) of 2,3,4,5-bis($\Delta^2$-butenylene)- tetrahydrofurfuryl alcohol in 150 grams of n-heptane was prepared and 7.2 grams of sodium hydroxide, as a 20 per cent solution in methanol, was added. This mixture was charged to a pressure reactor and heated to 250° F. An ethylene oxide solution, prepared by dissolving 128 grams (2.9 mols) of ethylene oxide in 128 grams of n-heptane was fed into the reactor continuously over a period of approximately one hour. The temperature during the addition of the ethylene oxide solution varied from 235–262° F. The highest pressure during the addition of the ethylene oxide was 48 pounds per square inch gage and at this time the temperature was 239° F. After addition was complete, the pressure dropped to 18 pounds per square inch gage as a result of consumption of ethylene oxide. The reaction mixture was then heated to 250° F. for an hour to allow the reaction to continue. Throughout the reaction period the mixture was agitated. When agitation was stopped phase separation occurred. The lower layer contained the product together with sodium hydroxide and some of the heptane. It was separated from the upper heptane layer and washed with 100 ml. water to remove the sodium hydroxide. About 50 ml. of heptane separated and was removed. The product layer was extracted with two portions of benzene, first with 150 ml. and finally with 100 ml. The benzene extracts were filtered, and the filtrate diluted with 1500 ml. benzene and allowed to set approximately 16 hours. The water layer which separated was removed. The benzene solution of the product was dried over anhydrous potassium carbonate for 1.5 hours and filtered. The major portion of the benzene was removed by distillation at atmospheric pressure and last traces were removed by gradually reducing the pressure to 1 mm. Hg and increasing the temperature to 100° C. A light yellowish-brown liquid product remained. The yield was 203 grams. This material had a molecular weight of 348, hydroxyl number (mg. KOH per g sample) of 156, 67.89 per cent carbon, and 7.73 per cent hydrogen. Calculations based upon analytical results showed that the product contained an average of 3.2 ethylene oxide units per mol of polycyclic alcohol starting material.

Example II

The condensation product of ethylene oxide with 2,3,4,5-bis($\Delta^2$-butenylene)tetrahydrofurfuryl alcohol, prepared as described in Example I, was employed in two different quantities as a softener in a 74/26 butadiene-acrylonitrile copolymer prepared by emulsion polymerization. The compounding recipes are given below. A sample of the butadiene-acrylonitrile copolymer was also compounded in a similar manner except that the ethylene oxide condensation product was omitted. This latter sample was used as a control. The compounding recipes were as follows:

|  | A | B | C (Control) |
|---|---|---|---|
| Butadiene-acrylonitrile copolymer parts by weight | 100 | 100 | 100 |
| Philblack A [1] do | 60 | 60 | 60 |
| Zinc oxide do | 5 | 5 | 5 |
| Stearic acid do | 1.5 | 1.5 | 1.5 |
| Sulfur do | 1.5 | 2.0 | 1.5 |
| Altax [2] do | 1.5 | 1.75 | 1.5 |
| Ethylene oxide condensation product [3] do | 10 | 20 | ---------- |

[1] Medium abrasion furnace black.
[2] Benzothiazyl disulfide.
[3] Described in Example I.

The samples were cured at 307° F. for 30 minutes and physical properties determined. Swelling tests were made on the cured samples by immersing them in a mixture containing 30 per cent toluene and 70 per cent isooctane at room temperature (80° F.) for seven days. The per cent material extracted was determined by both weight and aliquot methods. In the weight method a sample is weighed prior to the swelling test, immersed in the extraction liquid for the requisite period, dried, and weighed again. In the aliquot method the quantity of extractable material is determined by evaporating the immersion liquid at the conclusion of the swelling test, drying the residue in an oven at 220° F. for 30 minutes, and weighing. Results of tests on physical properties were as follows:

|  | A | B | C (Control) |
|---|---|---|---|
| Unaged samples: |  |  |  |
| Stress-strain properties at 80° F.— |  |  |  |
| 300 modulus, p. s. i | 2,750 | 2,650 | 3,260 |
| Tensile, p. s. i | 3,200 | 2,840 | 3,450 |
| Elongation, percent | 350 | 320 | 315 |
| Shore hardness | 67 | 63 | 73 |
| Compression set, percent | 16.0 | 19.1 | 8.2 |
| Compound MS—1½ at 212° F | 48 | 34 | 70 |
| Percent swelled [1] | 35.8 | 27.6 | 43.8 |
| Percent extracted [1]— |  |  |  |
| Weight | 4.5 | 8.4 | 2.3 |
| Aliquot | 4.5 | 8.5 | 1.2 |
| Freeze point, ° C., Gehman | −34 | −34 | −20 |
| Oven aged 24 hours at 212° F.: |  |  |  |
| Stress-strain properties at 80° F.— |  |  |  |
| Tensile, p. s. i | 2,900 | 2,970 | 3,510 |
| Elongation, percent | 250 | 270 | 230 |

[1] 45 minutes cure.

The foregoing examples are illustrative of one embodiment of my invention and are not to be construed as unduly limiting. Those skilled in the art will appreciate that many modifications, both in starting materials and conditions, can be employed without departing from the spirit and scope of my invention.

I claim:

1. A composition of matter comprising at least one compound represented by a formula selected from the group consisting of

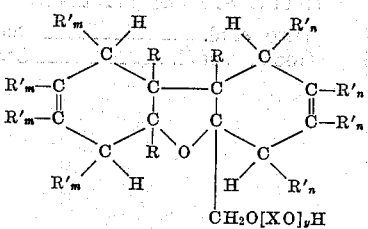
I

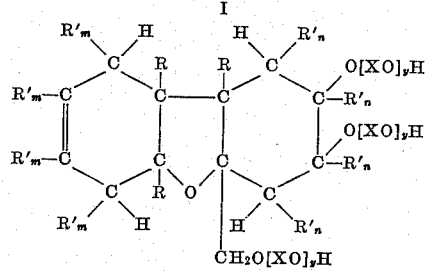
II

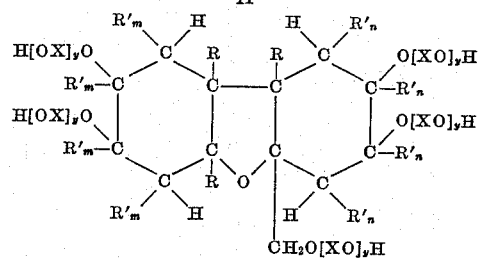
III

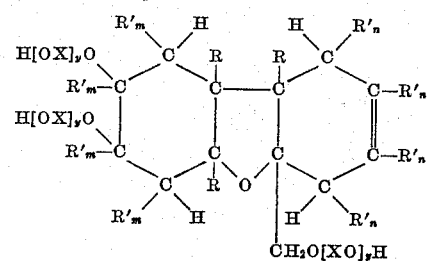
IV

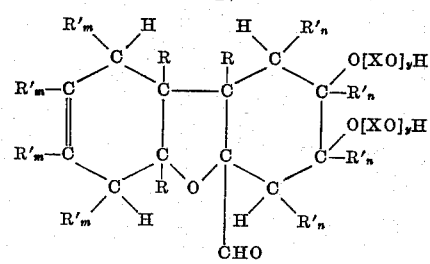
V

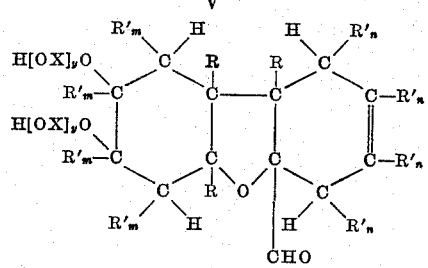
VI

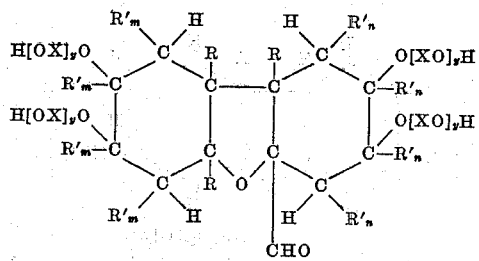
VII and the hydrogenated derivatives of compounds I, II, IV, V and VI wherein X is an alkylene radical containing from 2 to 5 carbon atoms, $y$ is an integer from 1 to 16; each R is of the group consisting of hydrogen and methyl and at least one R is hydrogen; each R' is selected from the group consisting of hydrogen and an alkyl group having not more than 3 carbon atoms; the sum of the carbon atoms in the R'$_m$ groups is less than 4; the sum of the carbon atoms in the R'$_n$ groups is less than 4; and at least two of the R'$_m$ and at least two of the R'$_n$ groups are hydrogen.

2.

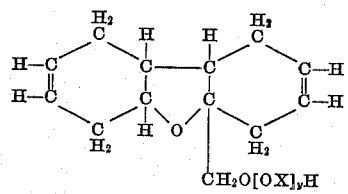

wherein X is an alkylene radical containing from 2 to 5 carbon atoms and $y$ is an integer from 1 to 16.

3.

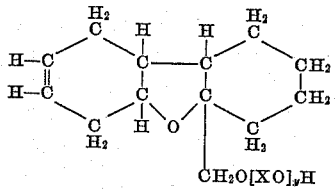

wherein X is an alkylene radical containing from 2 to 5 carbon atoms and $y$ is an integer from 1 to 16.

4.

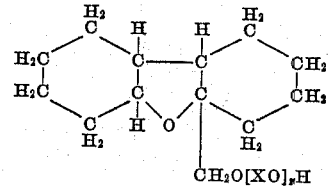

wherein X is an alkylene radical containing from 2 to 5 carbon atoms and $y$ is an integer from 1 to 16.

5.

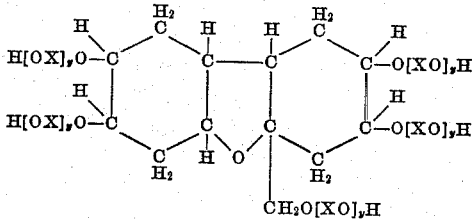

wherein X is an alkylene radical containing from 2 to 5 carbon atoms and $y$ is an integer from 1 to 16.

6.

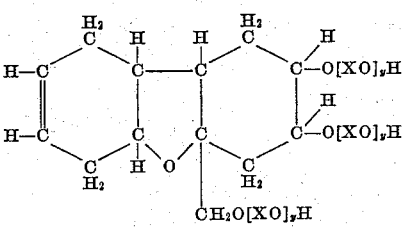

wherein X is an alkylene radical containing from 2 to 5 carbon atoms and $y$ is an integer from 1 to 16.

7. A rubber composition comprising a rubber selected from the group consisting of synthetic and natural rubbers, said composition containing a softening amount of the composition of claim 1.

8. A rubber composition comprising a butadiene-acrylonitrile copolymer containing from 5 to 25 weight per cent of the condensation product of 2,3,4,5-bis($\Delta^2$-butenylene)tetrahydrofurfuryl alcohol and ethylene oxide.

References Cited in the file of this patent

UNITED STATES PATENTS

| | | |
|---|---|---|
| 2,572,577 | Tissol et al. | Oct. 23, 1951 |
| 2,610,116 | Goodhue et al. | Sept. 9, 1952 |